United States Patent
Hanazawa (10) Patent No.: US 10,418,030 B2
(45) Date of Patent: Sep. 17, 2019

(54) ACOUSTIC MODEL TRAINING DEVICE, ACOUSTIC MODEL TRAINING METHOD, VOICE RECOGNITION DEVICE, AND VOICE RECOGNITION METHOD

(71) Applicant: MITSUBISHI ELECTRIC CORPORATION, Tokyo (JP)

(72) Inventor: Toshiyuki Hanazawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/086,738

(22) PCT Filed: May 20, 2016

(86) PCT No.: PCT/JP2016/064981
§ 371 (c)(1),
(2) Date: Sep. 20, 2018

(87) PCT Pub. No.: WO2017/199416
PCT Pub. Date: Nov. 23, 2017

(65) Prior Publication Data
US 2019/0096392 A1    Mar. 28, 2019

(51) Int. Cl.
*G10L 15/06* (2013.01)
*G10L 15/07* (2013.01)
*G10L 15/22* (2006.01)

(52) U.S. Cl.
CPC ............ *G10L 15/063* (2013.01); *G10L 15/07* (2013.01); *G10L 15/22* (2013.01)

(58) Field of Classification Search
CPC ........ G10L 15/063; G10L 15/22; G10L 15/07

USPC ......................................................... 704/243
See application file for complete search history.

(56) References Cited

U.S. PATENT DOCUMENTS

| | | | | |
|---|---|---|---|---|
| 5,950,157 A | * | 9/1999 | Heck ....................... | G10L 17/20 704/234 |
| 7,567,903 B1 | * | 7/2009 | Goffin ..................... | G10L 15/12 704/234 |
| 7,930,181 B1 | * | 4/2011 | Goffin ..................... | G10L 15/02 704/231 |
| 2008/0071540 A1 | * | 3/2008 | Nakano ................... | G10L 15/20 704/251 |
| 2010/0004931 A1 | * | 1/2010 | Ma ........................... | G10L 15/08 704/244 |

(Continued)

FOREIGN PATENT DOCUMENTS

JP    2006-349723 A    12/2006

*Primary Examiner* — Edwin S Leland, III
(74) *Attorney, Agent, or Firm* — Birch, Stewart, Kolasch & Birch, LLP (57) ABSTRACT

An acoustic model training device includes: a processor to execute a program; and a memory to store the program which, when executed by the processor, performs processes of: generating, based on feature vectors obtained by analyzing utterance data items of a plurality of speakers, a training data item of each speaker by subtracting, for each speaker, a mean vector of all the feature vectors of the speaker from each of the feature vectors of the speaker; generating a training data item of all the speakers by subtracting a mean vector of all the feature vectors of all the speakers from each of the feature vectors of all the speakers; and training an acoustic model using the training data item of each speaker and the training data item of all the speakers.

5 Claims, 7 Drawing Sheets

(56) References Cited

U.S. PATENT DOCUMENTS

| | | | |
|---|---|---|---|
| 2017/0040016 A1* | 2/2017 | Cui ....................... | G10L 15/063 |
| 2017/0076715 A1* | 3/2017 | Ohtani .................... | G10L 13/04 |
| 2017/0236518 A1* | 8/2017 | Lane ....................... | G10L 15/14 |
| | | | 704/240 |
| 2017/0270919 A1* | 9/2017 | Parthasarathi, Sr. ... | G10L 15/20 |
| 2019/0096392 A1* | 3/2019 | Hanazawa .............. | G10L 15/07 |

\* cited by examiner

ACOUSTIC MODEL TRAINING DEVICE, ACOUSTIC MODEL TRAINING METHOD, VOICE RECOGNITION DEVICE, AND VOICE RECOGNITION METHOD

TECHNICAL FIELD

The present invention relates to an acoustic model training device and an acoustic model training method for training an acoustic model for voice recognition, and a voice recognition device and a voice recognition method for recognizing input voice using an acoustic model.

BACKGROUND ART

In recent voice recognition, a method of performing pattern matching based on statistical techniques with a frequency pattern of input voice as a feature vector is mainly used. In this method, voice recognition is provided by pattern matching between an acoustic model previously obtained by using feature vectors of frequency patterns of voice data uttered by a large number of speakers and modeling statistical features of the feature vectors, and feature vectors of input voice. Thus, by training an acoustic model using, as training data, voice obtained by recording utterances of many speakers by means of different microphones having different frequency characteristics, since feature vectors of the data are statistically reflected in the acoustic model, it is possible to construct an acoustic model that is robust to different microphones or speakers. However, the dispersion of feature vectors represented by the acoustic model may be increased, and the identification performance may be degraded.

To the contrary, there is a method called cepstral mean normalization (CMN) that decreases the dispersion of an acoustic model and improves recognition performance. In training of the acoustic model, this method uses, as training data, the resultant obtained by, based on feature vectors of voice data of each speaker included in training data, for each speaker, obtaining a mean vector of the feature vectors of the speaker and subtracting the mean vector from the feature vectors of the speaker. The mean vector represents an average characteristic of the frequency characteristic of the microphone used for recording the voice of the speaker and a frequency pattern of the voice of the speaker. Thus, by subtracting the mean vector from the feature vectors of the speaker, it is possible to absorb differences in microphones or speakers to some extent. When an acoustic model for, for example, the vowel "a" is trained using this training data, it is possible to more accurately model a feature vector of the sound of "a" itself while reducing effects due to differences in microphones or speakers, providing the advantage of improving recognition performance. However, to perform voice recognition using an acoustic model trained by performing CMN, it is necessary to obtain a mean vector of input voice in some way and subtract it from the input voice, also in voice recognition.

Patent Literature 1 discloses a method that, when a hidden Markov model (HMM) is used as an acoustic model, performs CMN by approximately obtaining a mean vector from HMM parameters obtained after the training, instead of performing CMN in the training. It discloses a technique that, by combining this method with noise adaptation of an acoustic model, quickly obtains an acoustic model that is robust to both multiplicative distortion due to difference in frequency characteristics of microphones or other factors and additive distortion due to ambient noise or other factors.

Patent Literature 1 discloses, as a method of calculating a mean vector of input voice, a method of calculating, for each utterance of input voice, a mean vector from the entire utterance, or calculating a mean vector from feature vectors until the preceding utterance in voice recognition.

CITATION LIST

Patent Literature

Patent Literature 1: Japanese Patent Application Publication No. 2006-349723

SUMMARY OF INVENTION

Technical Problem

However, the method of Patent Literature 1 has a problem in that since a mean vector of an entire utterance cannot be calculated until the utterance is completed, recognition processing cannot be performed until the utterance is completed, resulting in low response speed of recognition.

The present invention is intended to solve the above problem. It is intended to ensure the accuracy of voice recognition without delay in completion of recognition with respect to the first utterance even when there is difference in frequency characteristics of microphones or ambient noise.

Solution to Problem

An acoustic model training device according to the present invention includes: a speaker-by-speaker training data generation means for generating, based on feature vectors obtained by analyzing utterance data items of a plurality of speakers, a training data item of each speaker by subtracting, for each speaker, a mean vector of all the feature vectors of the speaker from each of the feature vectors of the speaker; an all-speaker training data generation means for generating a training data item of all the speakers by subtracting a mean vector of all the feature vectors of all the speakers from each of the feature vectors of all the speakers; and a training means for training an acoustic model using the training data item of each speaker and the training data item of all the speakers.

A voice recognition device according to the present invention includes: an analyzing means for analyzing an input voice and outputting first feature vectors; a correcting means for determining whether the voice is a first utterance, setting, based on second feature vectors obtained by analyzing utterance data items of a plurality of speakers, a mean vector of all the second feature vectors of all the speakers as a correction vector if the voice is the first utterance, setting a mean vector of the first feature vectors until a preceding utterance as the correction vector if the voice is not the first utterance, and outputting corrected vectors obtained by subtracting the correction vector from the first feature vectors; and a comparing means for comparing the corrected vectors with an acoustic model trained using a training data item of each speaker generated by subtracting, for each speaker, a mean vector of all the second feature vectors of the speaker from the second feature vectors of the speaker, and a training data item of all the speakers generated by subtracting a mean vector of all the second feature vectors of all the speakers from the second feature vectors of all the speakers, and outputting a recognition result of the voice.

Advantageous Effects of Invention

The acoustic model training device of the present invention trains an acoustic model using a training data item of each speaker generated by subtracting, for each speaker, a mean vector of all the feature vectors of the speaker from each of the feature vectors of the speaker and a training data item of all the speakers generated by subtracting a mean vector of all the feature vectors of all the speakers from each of the feature vectors of all the speakers, and trains the acoustic model using the training data item of all the speakers, which is made generally consistent with the feature vectors of the training data item of each speaker, and thus can train an acoustic model ensuring recognition accuracy with different microphones or speakers as training data without delay in completion of recognition with respect to the first utterance. Further, with respect to the second or later utterance, it is possible to construct an acoustic model in which variation in feature vectors due to differences in microphones or speakers is absorbed by performing CMN.

The voice recognition device of the present invention sets a mean vector of all the feature vectors of all the speakers as a correction vector if the input voice is the first utterance, compares corrected vectors obtained by subtracting the correction vector from feature vectors of the input voice with the acoustic model, and outputs a recognition result of the input voice, and thus can ensure the accuracy of voice recognition with different microphones or speakers as training data without delay in completion of recognition with respect to the first utterance. Further, with respect to the second or later utterance, by performing CMN, it is possible to obtain a recognition result of the input voice while absorbing variation in feature vectors due to differences in microphones or speakers.

DESCRIPTION OF EMBODIMENTS

Hereinafter, embodiments of an acoustic model training device, an acoustic model training method, a voice recognition device, and a voice recognition method according to the present invention will be described in detail with reference to the drawings. The present invention is not limited by the embodiments.

First Embodiment

Figure 1:
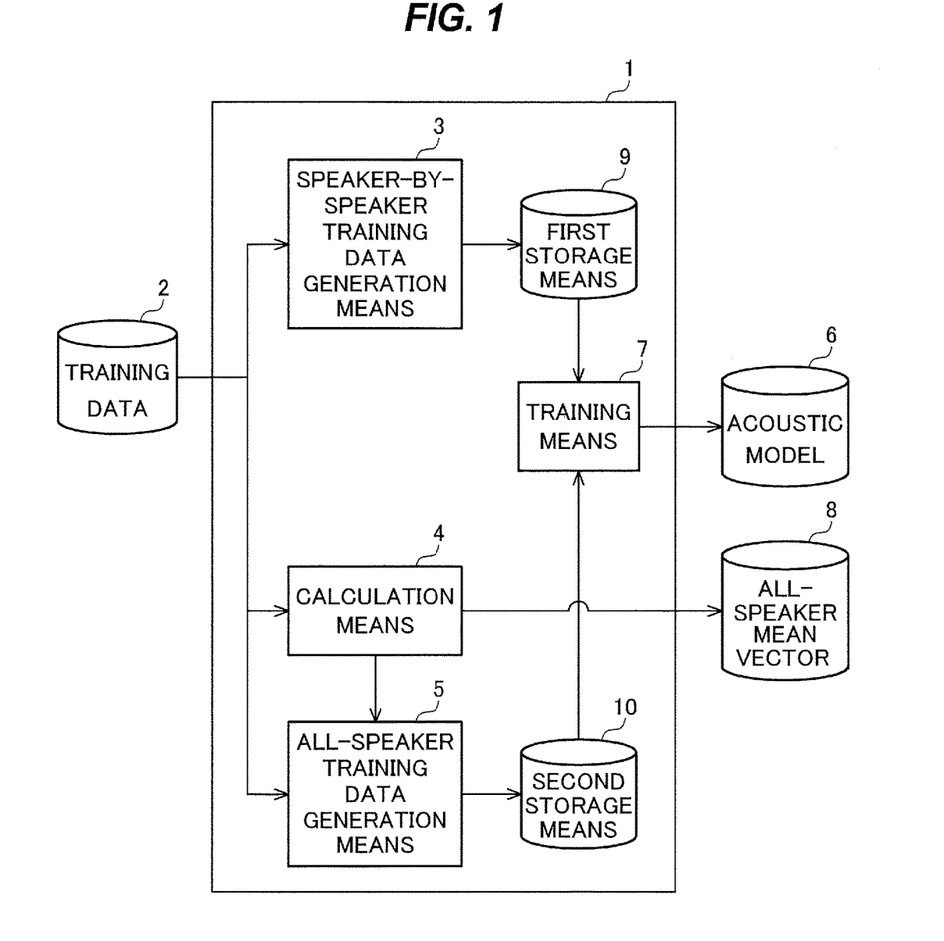
FIG. 1 is a configuration diagram of an acoustic model training device 1 of a first embodiment of the present invention.

FIG. 1 is a configuration diagram of an acoustic model training device 1 of a first embodiment of the present invention.

In FIG. 1, the acoustic model training device 1 includes a speaker-by-speaker training data generation means (or speaker-by-speaker training data generator) 3 to which training data 2 consisting of feature vectors obtained by acoustically analyzing utterance (or speech) data items of multiple speakers is input and that generates speaker-by-speaker training data items by performing CMN on feature vectors of utterance data items of each speaker, a calculation means (or calculator) 4 that calculates a mean vector of the feature vectors of all the speakers, an all-speaker training data generation means (or all-speaker training data generator) 5 that generates an all-speaker training data item by performing CMN on the feature vectors of all the speakers using the mean vector calculated by the calculation means 4, and a training means (or trainer) 7 that trains an acoustic model 6 using the speaker-by-speaker training data items and all-speaker training data item. Also, the acoustic model training device 1 includes a first storage means (or first memory) 9 that stores the speaker-by-speaker training data items generated by the speaker-by-speaker training data generation means 3, and a second storage means (or second memory) 10 that stores the all-speaker training data item generated by the all-speaker training data generation means 5.

The training data 2 is input data to the acoustic model training device 1 and consists of the feature vectors obtained by acoustically analyzing the utterance data items, which are recorded by the multiple speakers using different microphones having different frequency characteristics. There are multiple utterance data items for each of the speakers. The feature vectors are each a vector representing a spectral feature that is a frequency pattern of voice. In this embodiment, 1st- to 12th-order data of Mel-frequency cepstral coefficients (MFCCs) are used, for example. The feature vectors are obtained by dividing voice data into intervals, called frames, of 10 milliseconds and performing acoustic analysis on each frame, so multiple feature vectors are obtained from voice data of one utterance. For example, in the case of a 1-second utterance, since 1 second equals 1000 milliseconds, 100 (=1000 milliseconds/10 milliseconds) feature vectors are obtained. Since there are multiple utterances for each speaker as described above, the training data includes, for each speaker, multiple feature vectors depending on the amount of the utterance data items.

The speaker-by-speaker training data generation means 3 calculates, from the input training data 2, for each speaker, a mean vector of all the feature vectors of the speaker. The speaker-by-speaker training data generation means 3 then performs a CMN in which for each speaker, the mean vector of the speaker is subtracted from each of the feature vectors of the speaker. The speaker-by-speaker training data generation means 3 then generates a training data item (speaker-by-speaker training data item) of each speaker consisting of the feature vectors subjected to the CMN, and outputs and stores the generated speaker-by-speaker training data items into the first storage means 9.

The calculation means 4 calculates, from the input training data 2, a mean of all the feature vectors of all the speakers, and outputs it as an all-speaker mean vector to the all-speaker training data generation means 5. The calculation means 4 also outputs the calculated all-speaker mean vector from the acoustic model training device 1. The output all-speaker mean vector is used by a voice recognition device to be described later.

The all-speaker training data generation means 5 performs a CMN by subtracting the all-speaker mean vector calculated by the calculation means 4 from each of the feature vectors of all the speakers. The all-speaker training data generation means 5 then generates a training data item (all-speaker training data item) of all the speakers consisting of the feature vectors subjected to the CMN, and outputs and stores the generated all-speaker training data item into the second storage means 10.

The training means 7 trains the acoustic model 6 using the speaker-by-speaker training data items stored in the first storage means 9 and the all-speaker training data item stored in the second storage means 10, and outputs the trained acoustic model 6 from the acoustic model training device 1.

Figure 2:
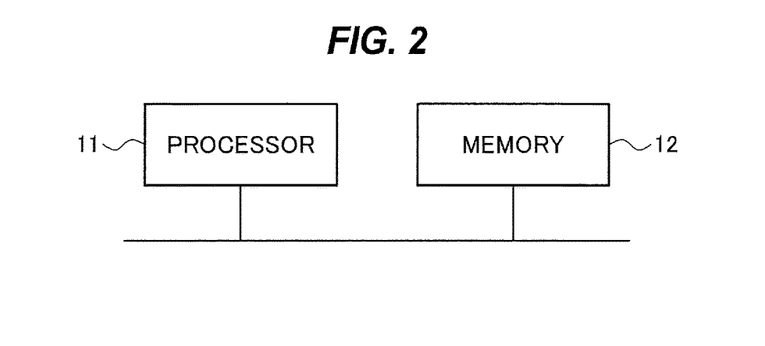
FIG. 2 is a hardware configuration diagram of the acoustic model training device 1 of the first embodiment of the present invention.

FIG. 2 is a hardware configuration diagram of the acoustic model training device 1 of the first embodiment of the present invention.

The acoustic model training device 1 includes a processor 11 and a memory 12. The speaker-by-speaker training data generation means 3, calculation means 4, all-speaker training data generation means 5, and training means 7 of the acoustic model training device 1 are implemented by the processor 11 executing a program stored in the memory 12. The first storage means 9 and second storage means 10 of the acoustic model training device 1 are the memory 12, but they may be, for example, a disk storage or the like.

Next, an operation of the acoustic model training device 1 will be described.

Figure 3:
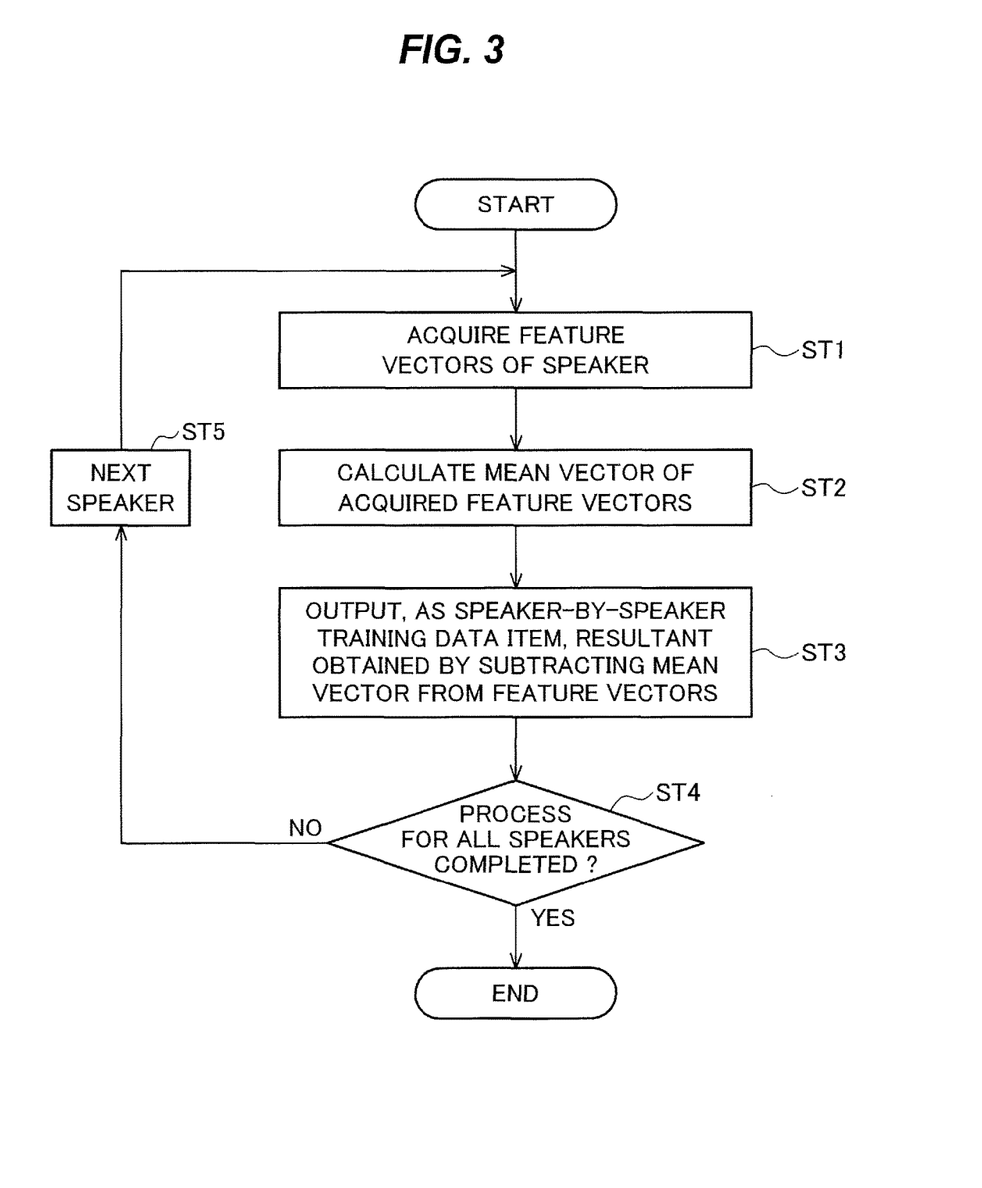
FIG. 3 is a flowchart illustrating an operation of a speaker-by-speaker training data generation means 3 of the first embodiment of the present invention.

First, an operation of the speaker-by-speaker training data generation means 3 will be described.

FIG. 3 is a flowchart illustrating the operation of the speaker-by-speaker training data generation means 3 of the first embodiment of the present invention.

The speaker-by-speaker training data generation means 3 acquires, from the training data 2, the feature vectors of a speaker (step (hereinafter referred to as ST) 1). The speaker-by-speaker training data generation means 3 then calculates a mean vector of all the feature vectors of the speaker (ST 2). The speaker-by-speaker training data generation means 3 then performs the CMN in which the calculated mean vector of the speaker is subtracted from each of the feature vectors of the speaker, thereby generating the training data item (speaker-by-speaker training data item) of the speaker, and outputs and stores it into the first storage means 9 (ST 3). The speaker-by-speaker training data generation means 3 then determines whether the speaker-by-speaker training data items of all the speakers have been generated (ST 4); if they have not been generated, the process for the next speaker is performed (ST 5), and if they have been generated, the operation ends.

Figure 4:
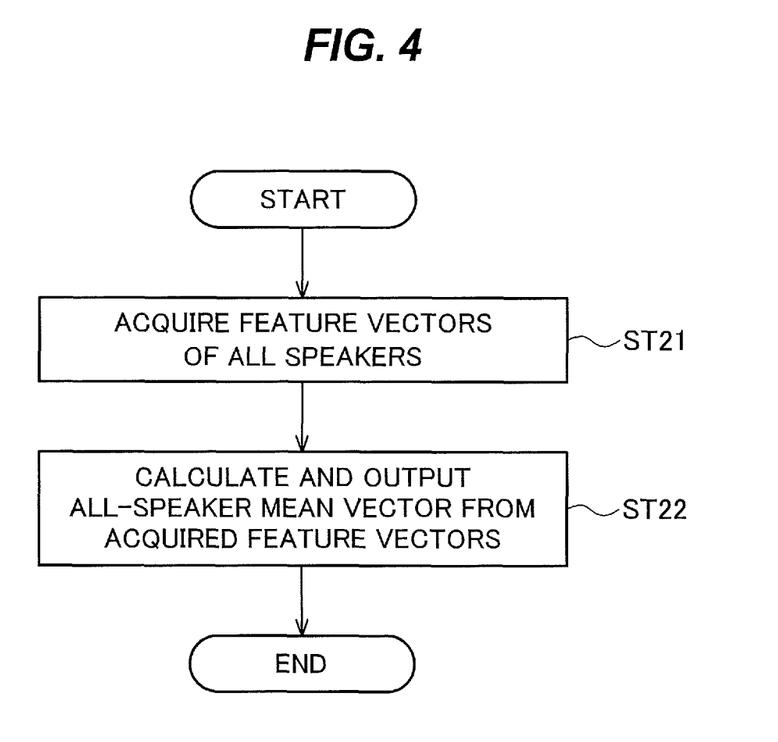
FIG. 4 is a flowchart illustrating an operation of a calculation means 4 of the first embodiment of the present invention.

Next, an operation of the calculation means 4 will be described.

FIG. 4 is a flowchart illustrating the operation of the calculation means of the first embodiment of the present invention.

The calculation means 4 acquires, from the training data 2, the feature vectors of all the speakers (ST 21), calculates a mean of all the training data 2, that is, all the feature vectors of all the speakers, and outputs it as an all-speaker mean vector 8 from the acoustic model training device 1. The calculation means 4 also outputs the all-speaker mean vector 8 to the all-speaker training data generation means 5 (ST 22).

Figure 5:
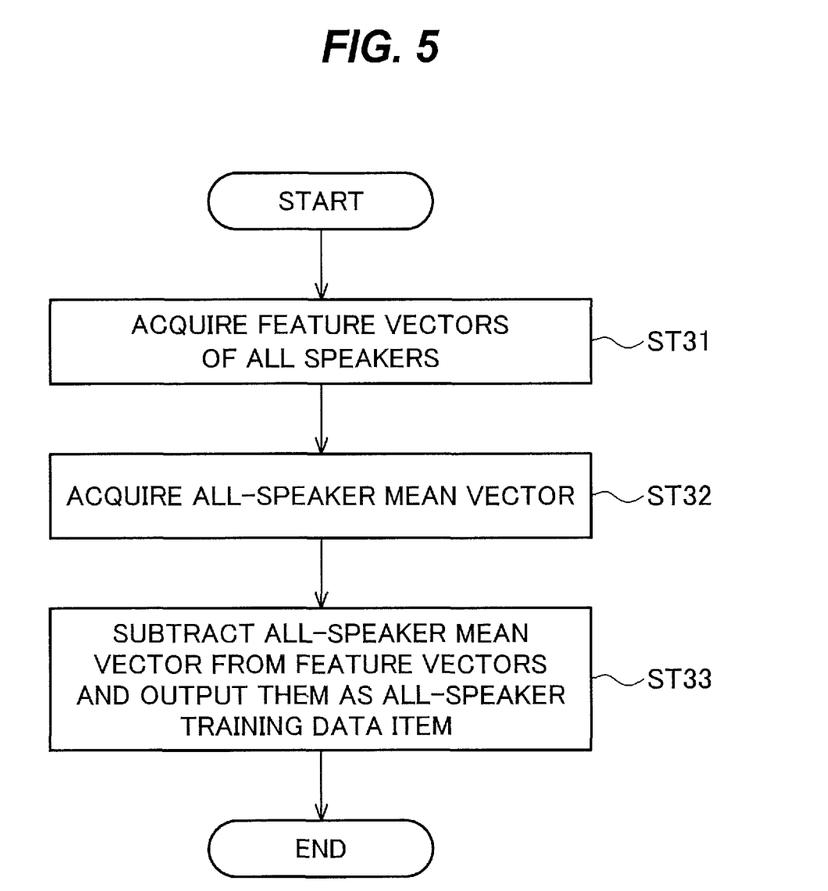
FIG. 5 is a flowchart illustrating an operation of an all-speaker training data generation means 5 of the first embodiment of the present invention.

Next, an operation of the all-speaker training data generation means 5 will be described.

FIG. 5 is a flowchart illustrating the operation of the all-speaker training data generation means 5 of the first embodiment of the present invention.

The all-speaker training data generation means 5 acquires, from the training data 2, all the feature vectors (all-speaker feature vectors) of all the speakers (ST 31). The all-speaker training data generation means 5 then acquires the all-speaker mean vector 8 from the calculation means 4 (ST 32), performs the CMN in which the all-speaker mean vector 8 is subtracted from the all-speaker feature vectors, thereby generating the training data item (all-speaker training data item) of all the speakers, and outputs and stores it into the second storage means 10 (ST 33).

By subtracting the all-speaker mean vector 8 from all the feature vectors of all the speakers in this manner, it is possible to generally correct inconsistency with the speaker-by-speaker training data items. The inconsistency here refers to the fact that since the speaker-by-speaker training data items are generated by subtracting the mean vector for each speaker, they greatly differ from the feature vectors subjected to no subtraction. If the acoustic model 6 is trained by simply using both, correct statistics cannot be calculated. Thus, the all-speaker training data item is generated by subtracting the calculated all-speaker mean vector 8 from the feature vectors of all the speakers. Although in the all-speaker training data item, variation in the all-speaker mean vector is not absorbed, subtracting the all-speaker mean vector can make them generally consistent with the feature vectors of the speaker-by-speaker training data items, making it possible to train an acoustic model using both.

Figure 6:
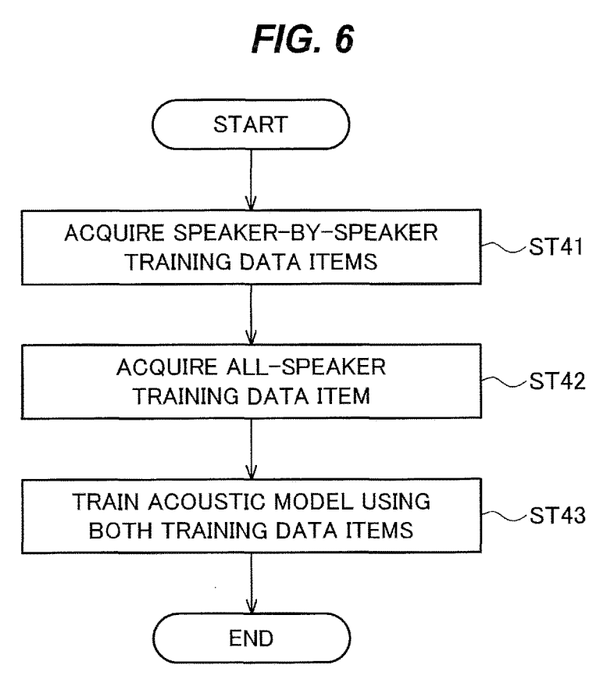
FIG. 6 is a flowchart illustrating an operation of a training means 7 of the first embodiment of the present invention.

Next, an operation of the training means 7 will be described.

FIG. 6 is a flowchart illustrating the operation of the training means 7 of the first embodiment of the present invention.

The training means 7 acquires the speaker-by-speaker training data items from the first storage means 9 (ST 41). The training means 7 also acquires the all-speaker training data item from the second storage means 10 (ST 42). The training means 7 then trains the acoustic model using both the speaker-by-speaker training data items and the all-speaker training data item, and outputs it from the acoustic model training device 1 (ST 43). When the acoustic model 6 is an HMM, the training means 7 trains the acoustic model 6 using a maximum likelihood estimation method. Alternatively, other training methods, such as mutual information maximization estimation, may be used. When the acoustic model 6 is a neural network, the training is performed using an error backpropagation algorithm according to a cross entropy minimization criterion, for example.

The phonetic unit of modeling of the acoustic model 6 is, for example, a phoneme. Phonemes include vowels and consonants, and for example, the sound of "ka" consists of the consonant /k/ and the vowel /a/. Here, the slashes (//) are symbols used in representing a phoneme. If acoustic models for all the phonemes are trained, it is possible to model feature vectors of all words by connecting the acoustic models for the phonemes.

Advantages provided by training as above will be described.

The speaker-by-speaker training data items make it possible to accurately train the acoustic model while reducing variation in feature vectors due to differences in microphones or speakers, providing the advantage of improving recognition performance. On the other hand, the all-speaker training data item is obtained by merely performing subtraction uniformly on the feature vectors of the training data, and thus has the same characteristic as the original training data. Since the original training data includes the feature vectors of the speakers who performed recording by using the microphones having different frequency characteristics, there is an advantage that an acoustic model that is robust to differences in microphones or speakers is constructed.

Further, by subtracting the all-speaker mean vector from the feature vectors of all the speakers, it is possible to make the feature vectors of all the speakers generally consistent with the feature vectors of the speaker-by-speaker training data items, and train an acoustic model having the features of both the training data items. Thus, with respect to an input voice, it is possible to construct an acoustic model having high robustness with respect to the first utterance, on which CMN, i.e., subtraction of a mean vector is hard to perform. Further, with respect to the second or later utterance, it is possible to construct an acoustic model in which variation in feature vectors due to differences in microphones or speakers is absorbed by performing CMN.

The voice recognition device using the above-described acoustic model will now be described.

Figure 7:
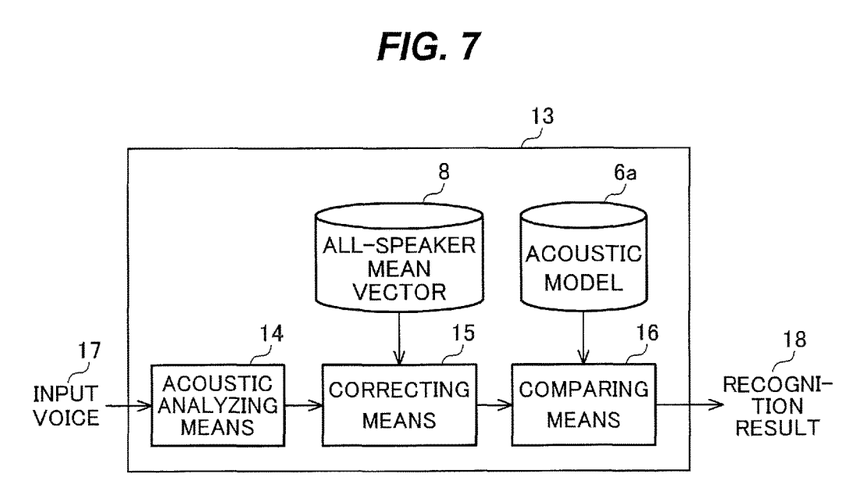
FIG. 7 is a configuration diagram of a voice recognition device 13 of the first embodiment of the present invention.

FIG. 7 is a configuration diagram of the voice recognition device 13 of the first embodiment of the present invention.

The voice recognition device 13 includes an acoustic analyzing means (or acoustic analyzer) 14, a correcting means (or corrector) 15, a comparing or matching means (or comparator or matcher) 16, an all-speaker mean vector 8, and an acoustic model 6a. The acoustic analyzing means 14 is an analyzing means or analyzer.

The hardware configuration of the voice recognition device 13 may be the same as that of the acoustic model training device 1 illustrated in FIG. 2. That is, the voice recognition device 13 includes a processor 11 and a memory 12 illustrated in FIG. 2. Specifically, the acoustic analyzing means 14, correcting means 15, and comparing means 16 are implemented by the processor 11 executing a program stored in the memory 12. Also, the all-speaker mean vector 8 and acoustic model 6a are implemented by the memory 12.

The voice recognition device 13 obtains feature vectors (first feature vectors) obtained by the acoustic analyzing means 14 analyzing an input voice 17. Then, the voice recognition device 13 determines, in the correcting means 15, whether the input voice 17 is the first utterance, and if it is the first utterance, sets the all-speaker mean vector 8 generated by the acoustic model training device 1 as a correction vector. Further, the voice recognition device 13 subtracts the correction vector from the feature vectors obtained by analysis by the acoustic analyzing means 14 to obtain corrected vectors, and temporarily store the feature vectors before the correction (uncorrected feature vectors).

If the input voice 17 is not the first utterance, the voice recognition device 13 sets a mean vector of the uncorrected feature vectors until the preceding utterance that are temporarily stored, as the correction vector, and subtracts the correction vector from the feature vectors obtained by analysis by the acoustic analyzing means 14 to obtain corrected vectors. The voice recognition device 13 then compares (or matches), in the comparing means 16, the corrected vectors with the acoustic model trained by the acoustic model training device 1 to recognize the input voice 17, and outputs a recognition result 18.

The acoustic analyzing means 14 analyzes the input voice 17 and outputs feature vectors obtained by the analysis to the correcting means 15.

The correcting means 15 determines whether the input voice 17 is the first utterance. If the input voice 17 is the first utterance, the correcting means 15 sets the all-speaker mean vector 8 as the correction vector, and subtracts the correction vector from the feature vectors of the input voice 17 to obtain corrected vectors. Then, the correcting means 15 outputs the corrected vectors to the comparing means 16, and temporarily stores the uncorrected feature vectors.

If the input voice 17 is not the first utterance, the correcting means 15 sets a mean vector of the uncorrected feature vectors until the preceding utterance that are temporarily stored, as the correction vector, and subtracts the correction vector from the feature vectors of the input voice 17 to obtain corrected vectors. Then, the correcting means 15 outputs the corrected vectors to the comparing means 16, and temporarily stores the uncorrected feature vectors.

The comparing means 16 compares the corrected vectors input from the correcting means 15 with the acoustic model 6a to recognize the input voice 17, and outputs the recognition result 18.

The acoustic model 6a is the acoustic model 6a trained by the acoustic model training device 1 using the speaker-by-speaker training data items and all-speaker training data item, and is stored in the memory 12. The acoustic model 6a is referred to by the comparing means 16. For example, when voice recognition for words is performed with prefecture names as words to be recognized, the acoustic model 6a stores (or includes) word-by-word acoustic models obtained by connecting phoneme-by-phoneme acoustic models trained by the acoustic model training device 1 of the present invention. It consists of acoustic models for the words for the names of all the prefectures, wherein for example, the acoustic model for the word "Tokyo" is obtained by connecting the acoustic models for the phonemes /t/, /o/, /o/, /k/, /j/, /o/, and /o/ in series.

The all-speaker mean vector 8 is the all-speaker mean vector 8 generated by the calculation means 4 of the acoustic model training device 1, and is stored in the memory 12. The all-speaker mean vector 8 is referred to by the correcting means 15.

Next, an operation of the voice recognition device 13 will be described.

First, the acoustic analyzing means 14 acoustically analyzes the input voice 17 and outputs the feature vectors. The feature vectors are of the same type as the training data input to the acoustic model training device 1 of the present invention, and are 1st- to 12th-order data of MFCCs in this embodiment.

Next, the correcting means 15 determines whether the input voice 17 is the first utterance, and corrects the feature vectors input from the acoustic analyzing means 14 depending on whether it is the first utterance. Then, the correcting means 15 outputs the corrected feature vectors to the comparing means 16, and temporarily stores the feature vectors before the correction.

An operation of the correcting means 15 will be described in detail below.

Figure 8:
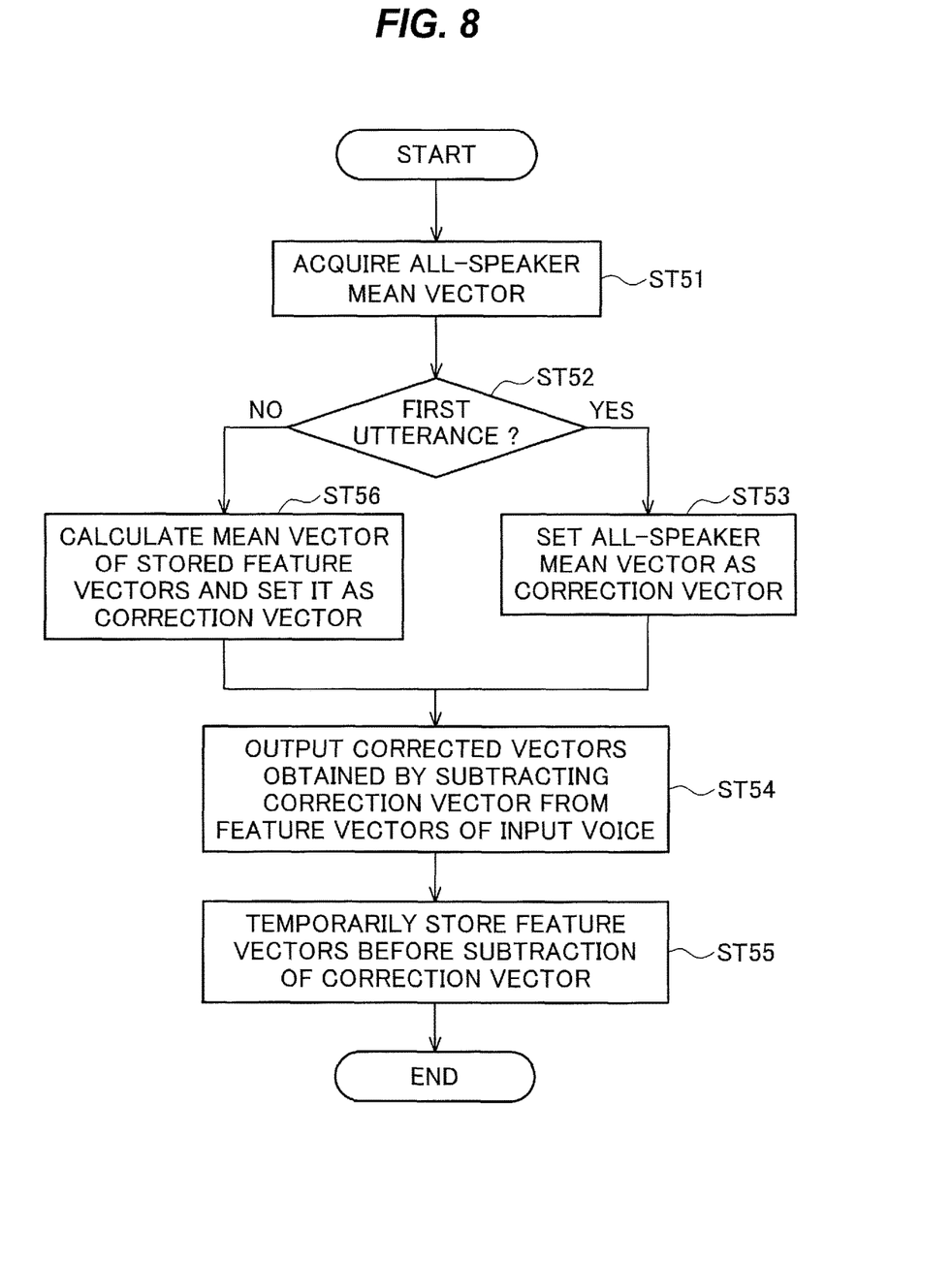
FIG. 8 is a flowchart illustrating an operation of a correcting means 15 of the first embodiment of the present invention.

FIG. 8 is a flowchart illustrating the operation of the correcting means 15 of the first embodiment of the present invention.

First, the correcting means 15 acquires the all-speaker mean vector 8 stored in the memory 12 (ST 51). The correcting means 15 then determines whether the input voice 17 is the first utterance (ST 52). The correcting means 15 counts the number of utterances for each speaker with respect to the input voice 17, and determines, based on the counted number of utterances, whether the input voice 17 is the first utterance. Alternatively, the correcting means 15 may determine whether the input voice 17 is the first utterance, by using internally and temporarily stored information indicating whether it is the first utterance or the second or later utterance.

Then, if the input voice 17 is the first utterance, the correcting means 15 sets the all-speaker mean vector 8 as the correction vector (ST 53). Further, the correcting means 15 outputs feature vectors obtained by performing a CMN in which the correction vector is subtracted from the feature vectors obtained by the acoustic analyzing means 14, as corrected vectors, to the comparing means 16 (ST 54). Further, the correcting means 15 temporarily stores the feature vectors before the subtraction, as uncorrected vectors (ST 55).

On the other hand, if the input voice 17 is not the first utterance (if the input voice 17 is the second or later utterance), the correcting means 15 performs a CMN to calculate corrected vectors. For example, the correcting means 15 obtains, as a mean vector, a mean of the uncorrected vectors until the preceding utterance that were temporarily stored in ST 55, and sets the obtained mean vector as the correction vector (ST 56). After that, the correcting means 15 performs the processes of ST 54 and ST 55 as in the case of the first utterance.

Since the all-speaker training data item used in training of the acoustic model 6a is generated by subtracting the all-speaker mean vector 8 from each of the feature vectors of all the speakers in the training data as described before, subtracting the all-speaker mean vector from the feature vectors of the input voice 17 in voice recognition has the effect of making the feature vectors of the input voice 17 consistent with the feature vectors in the training. When the all-speaker mean vector 8 is used as the correction vector, although the effect of absorbing variation in feature vectors due to differences in microphones or speakers, which is an effect of CMN, is not obtained, since the acoustic model according to the present invention is obtained using different microphones or speakers as training data, it is possible to provide voice recognition that is robust to some extent without delay in completion of voice recognition with respect to the first utterance.

Regarding the correction vector in the second or later utterance, it is also possible to weight and average a mean vector of the feature vectors until the preceding utterance that are temporarily stored in the correcting means 15 and the correction vector used one utterance before, and set the weighted average as the correction vector.

Figure 9:
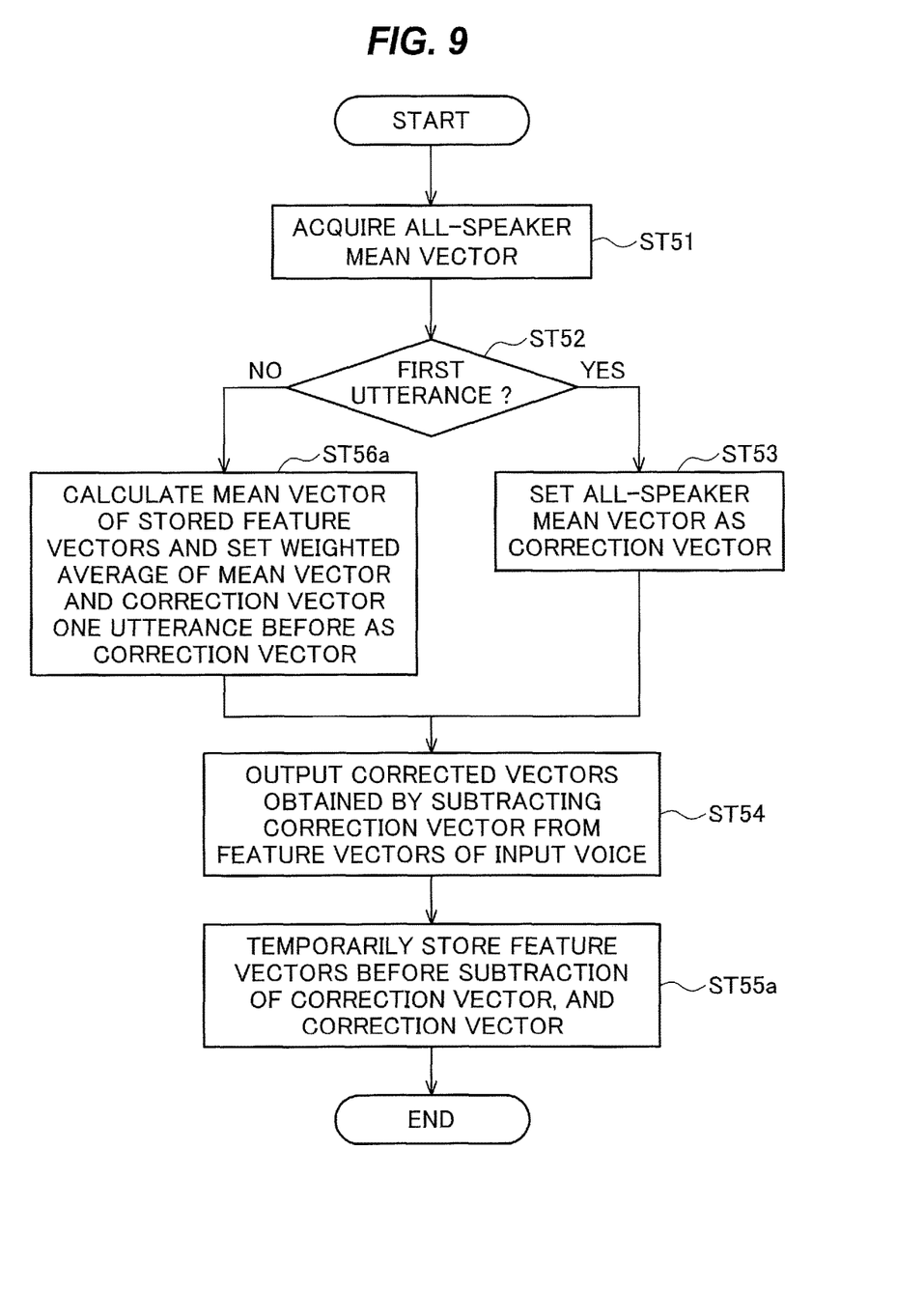
FIG. 9 is a flowchart illustrating another operation of the correcting means 15 of the first embodiment of the present invention.

FIG. 9 is a flowchart illustrating the operation of the correcting means 15 of the first embodiment of the present invention.

In FIG. 9, steps that are the same in operation as those of FIG. 8 are given the same reference numerals. FIG. 9 differs from FIG. 8 only in that the process of ST 55 in FIG. 8 is replaced with ST 55a in FIG. 9 and the process of ST 56 is replaced with ST 56a.

The operation of ST 55a temporarily stores the uncorrected vectors, which are the feature vectors before the subtraction, and the correction vector.

The operation of ST 56a weights and averages a mean vector of the uncorrected vectors until the preceding utterance that are temporarily stored by the correcting means 15 and the correction vector used one utterance before, and sets the weighted average as the correction vector, as described above.

When a weighted average of a mean vector of the feature vectors until the preceding utterance that are temporarily stored and the correction vector used one utterance before is obtained and set as the correction vector, as described above, it is obtained while more priority is given to the preceding utterance. Thus, even when a speaker change occurs in the middle, it is possible to quickly update the correction vector and improve the recognition rate.

The operation of the correcting means 15 has been described in detail above.

Now, returning to the operation of the voice recognition device 13, an operation of the comparing means 16 will be described.

The comparing means 16 performs pattern matching between the corrected vectors input from the correcting means 15 and the acoustic model 6a, and outputs the word corresponding to an acoustic model having the highest likelihood, as the recognition result 18. As the method of the pattern matching, a Viterbi algorithm is used, for example.

As described above, in the present invention, the acoustic model is trained by using, as training data, both the speaker-by-speaker training data items, which are obtained by performing the CMN using the mean vector of each speaker, and the all-speaker training data item, which is obtained by performing the CMN using the mean vector of all the speakers. In voice recognition, the all-speaker mean vector is used as the correction vector with respect to the first utterance. This is to calculate the feature vectors under the same conditions as the feature vectors of the all-speaker training data item used in training of the acoustic model. With respect to the first utterance, since the feature vectors of the input voice are corrected under the same conditions as the all-speaker training data item, as described above, it is possible to provide voice recognition that is robust to some extent without delay in completion of voice recognition with respect to the first utterance from different microphones or speakers, due to the effect of training of the acoustic model using the all-speaker training data item.

Further, with respect to the second or later utterance in voice recognition, by setting, for example, a mean vector of the feature vectors until the utterance before the input voice as the correction vector, it is possible to obtain an acoustic model that sufficiently exerts the effect of CMN against variation in feature vectors due to differences in microphones or speakers, and improve voice recognition performance. Since the feature vectors are calculated under the same conditions as the feature vectors of the speaker-by-speaker training data items, which are obtained by performing CMN using the mean vector of each speaker and used in training the acoustic model, an effect equivalent to that of performing CMN using a mean vector of each speaker under the same conditions in training of the acoustic model and in voice recognition is obtained, and recognition performance is improved. Further, there is an advantage that, even when a speaker change occurs at or after the second utterance and a slight inconsistency occurs in the correction vector, since the all-speaker training data item, which is obtained by performing CMN using the mean vector of all the speakers, is also used in training of the acoustic model, reduction in recognition performance is reduced, as compared to an acoustic model trained using only the speaker-by-speaker training data items, which are obtained by performing CMN.

Further, in Patent Literature 1, when the length of the input utterance is short, the accuracy of the mean vector is low, leading to low recognition performance. However, in the voice recognition device according to the present invention, since the voice recognition is performed using the acoustic model trained using both the speaker-by-speaker training data items, which are obtained by performing CMN using the mean vector of each speaker, and the all-speaker training data item, which is obtained by performing CMN using the mean vector of all the speakers, it is possible to reduce reduction in recognition performance when the length of the input utterance is short.

Further, in Patent Literature 1, since the mean vector is obtained from the entire training data, variation in feature vectors due to differences in speakers is not considered, which reduces recognition performance. However, in the voice recognition device according to the present invention, since the voice recognition is performed using the acoustic model trained using both the speaker-by-speaker training data items, which are obtained by performing CMN using the mean vector of each speaker, and the all-speaker training data item, which is obtained by performing CMN using the mean vector of all the speakers, it is possible to reduce reduction in recognition performance when there is variation in feature vectors due to differences in speakers.

In this embodiment, the description has been made by taking the HMM as an example of the acoustic model to be trained; however, for arbitrary acoustic models trained using training data, it is possible to train the acoustic model using both the speaker-by-speaker training data items, which are obtained by performing CMN using the mean vector of each speaker, and the all-speaker training data item, which is obtained by performing CMN using the mean vector of all the speakers, and the same advantages are obtained. For example, it is also possible to train a neural network as the acoustic model.

INDUSTRIAL APPLICABILITY

As above, the acoustic model training device and acoustic model training method according to the present invention train the acoustic model using, as training data, both the speaker-by-speaker training data items, which are obtained by performing CMN using the mean vector of each speaker, and the all-speaker training data item, which is obtained by performing CMN using the mean vector of all the speakers, and thus can construct an acoustic model having high robustness with respect to the first utterance, on which CMN is hard to perform.

Further, with respect to the first utterance of the input voice, the voice recognition device and voice recognition method according to the present invention correct the feature vectors of the input voice with the all-speaker mean vector and perform voice recognition by comparing the corrected feature vectors with the acoustic model, and thus can provide robust voice recognition without delay in completion of the voice recognition with respect to the first utterance. Further, with respect to the second or later utterance, by performing CMN, it is possible to obtain the recognition result of the input voice while absorbing variation in feature vectors due to differences in microphones or speakers.

REFERENCE SIGNS LIST

1 acoustic model training device, 2 training data, 3 speaker-by-speaker training data generation means, 4 calculation means, 5 all-speaker training data generation means, 6 acoustic model, 7 training means, 8 all-speaker mean vector, 9 first storage means, 10 second storage means, 11 processor, 12 memory, 13 voice recognition device, 14 acoustic analyzing means, 15 correcting means, 16 comparing means, 17 input voice, 18 recognition result.

The invention claimed is:

1. An acoustic model training device comprising:
a processor to execute a program; and
a memory to store the program which, when executed by the processor, performs processes of:
generating, based on feature vectors obtained by analyzing utterance data items of a plurality of speakers, a training data item of each speaker by subtracting, for each speaker, a mean vector of all the feature vectors of the speaker from each of the feature vectors of the speaker;
generating a training data item of all the speakers by subtracting a mean vector of all the feature vectors of all the speakers from each of the feature vectors of all the speakers; and
training an acoustic model using the training data item of each speaker and the training data item of all the speakers.

2. A voice recognition device comprising:
a processor to execute a program; and
a memory to store the program which, when executed by the processor, performs processes of:
analyzing an input voice and outputting first feature vectors;
determining whether the voice is a first utterance, setting, based on second feature vectors obtained by analyzing utterance data items of a plurality of speakers, a mean vector of all the second feature vectors of all the speakers as a correction vector if the voice is the first utterance, setting a mean vector of the first feature vectors until a preceding utterance as the correction vector if the voice is not the first utterance, and outputting corrected vectors obtained by subtracting the correction vector from the first feature vectors; and
comparing the corrected vectors with an acoustic model trained using a training data item of each speaker generated by subtracting, for each speaker, a mean vector of all the second feature vectors of the speaker from the second feature vectors of the speaker, and a training data item of all the speakers generated by subtracting a mean vector of all the second feature vectors of all the speakers from the second feature vectors of all the speakers, and outputting a recognition result of the voice.

3. The voice recognition device of claim 2, wherein the program performs storing the correction vector, and if the voice is not the first utterance, weights and averages a mean vector of the first feature vectors until the preceding utterance that are temporarily stored and the correction vector used one utterance before, and setting the weighted average as the correction vector.

4. An acoustic model training method of an acoustic model training device for training an acoustic model using feature vectors obtained by analyzing utterance data items of a plurality of speakers, the acoustic model training method comprising:
generating, based on the feature vectors, a training data item of each speaker by subtracting, for each speaker, a mean vector of all the feature vectors of the speaker from the feature vectors of the speaker;
generating a training data item of all the speakers by subtracting a mean vector of all the feature vectors of all the speakers from the feature vectors of all the speakers; and
training the acoustic model using the training data item of each speaker and the training data item of all the speakers.

5. A voice recognition method of a voice recognition device for performing voice recognition on an input voice, the voice recognition method comprising:

analyzing the input voice and outputting first feature vectors;

determining whether the voice is a first utterance, setting, based on second feature vectors obtained by analyzing utterance data items of a plurality of speakers, a mean vector of all the second feature vectors of all the speakers as a correction vector if the voice is the first utterance, setting a mean vector of the first feature vectors until a preceding utterance as the correction vector if the voice is not the first utterance, and outputting corrected vectors obtained by subtracting the correction vector from the first feature vectors; and comparing the corrected vectors with an acoustic model trained using a training data item of each speaker generated by subtracting, for each speaker, a mean vector of all the second feature vectors of the speaker from the second feature vectors of the speaker, and a training data item of all the speakers generated by subtracting a mean vector of all the second feature vectors of all the speakers from the second feature vectors of all the speakers, and outputting a recognition result of the voice.

* * * * *